Jan. 17, 1961 H. H. GREENLEY ET AL 2,968,764
ELECTROMAGNETIC INDICATORS
Filed Aug. 19, 1957 2 Sheets-Sheet 1

INVENTORS
Harold H. Greenley, &
BY Lucian B. Smith
J. W. Lovett
ATTORNEY

Jan. 17, 1961
H. H. GREENLEY ET AL
2,968,764
ELECTROMAGNETIC INDICATORS
Filed Aug. 19, 1957
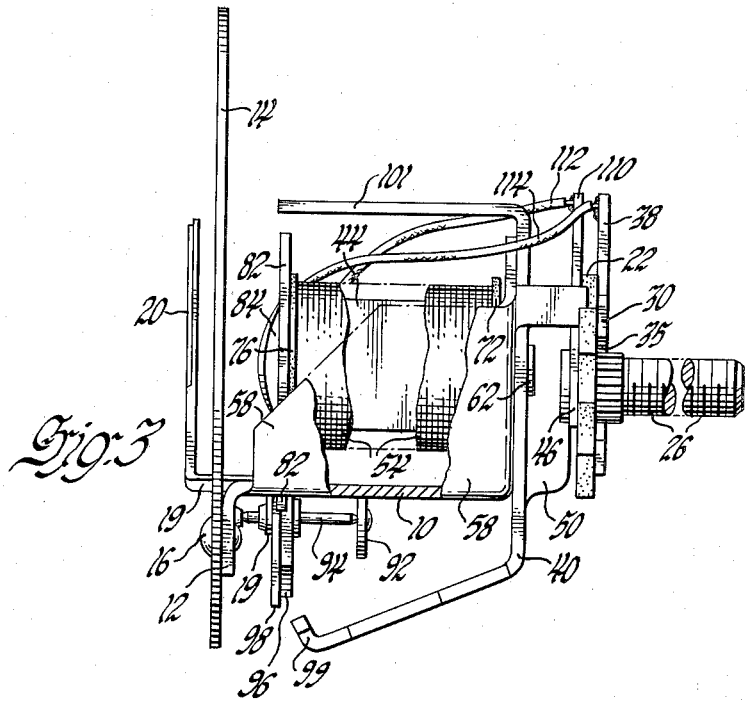
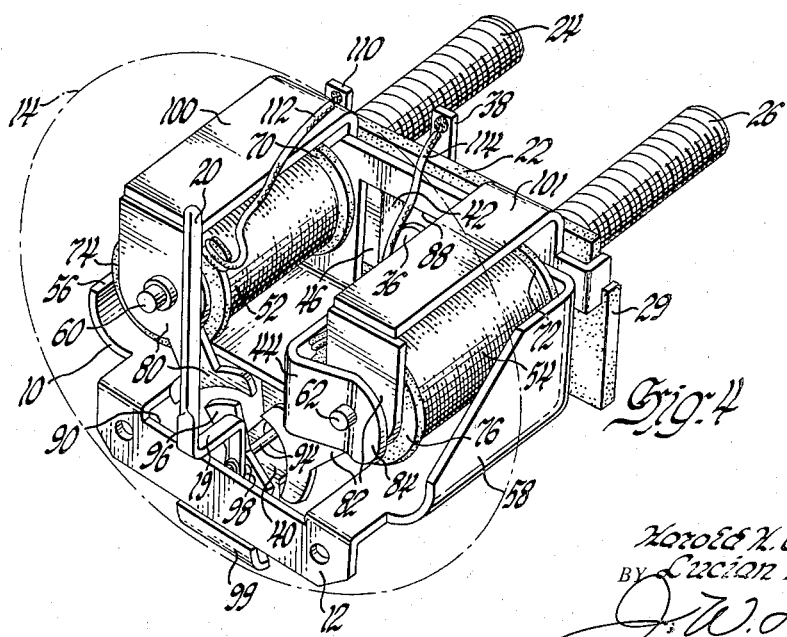
INVENTORS
Harold H. Greenley, &
BY Lucian B. Smith
ATTORNEY United States Patent Office 2,968,764
Patented Jan. 17, 1961

2,968,764

ELECTROMAGNETIC INDICATORS

Harold H. Greenley, Grand Blanc, and Lucian B. Smith, Flint, Mich., assignors to General Motors Corporation, Detroit, Mich., a corporation of Delaware Filed Aug. 19, 1957, Ser. No. 679,019

3 Claims. (Cl. 324—140)

This invention relates to electromagnetic indicators and more particularly to indicating instruments of the electromagnetic type such as may be used to function as fuel supply gauges or indicators of temperature.

In such devices a pointer is deflected to indicate a reading on a dial, the rotative motion of the pointer being brought about by torque exerted on an armature through action of electromagnetic coils. In such instruments it is of utmost importance to provide for effective and convenient calibration. Usually a sufficiently ductile and ferrous field piece is provided which may be bent to vary an air gap rendering a given coil more or less effective in developing the torque. Such instruments are of the type as disclosed in the United States patent application Serial No. 534,076, filed September 13, 1955, in the names of Homer R. Hastings and Clarence A Haut, and issued April 21, 1959, as Patent No. 2,883,623. While such instruments may be calibrated satisfactorily, they nevertheless require such handling that care is necessary not unduly to disturb fragile parts during calibration and it is quite possible to damage some parts of the instrument in the process. In prior devices the increase of an air gap to reduce the influence of an electromagnetic coil has resulted in an increase in the external flux in other paths which link the coil. This external flux is undesirable as it influences adjacent instruments and adjacent magnetic materials will affect the gauge in which the external flux obtains.

An object of the present invention is to provide an improved electromagnetic indicator with elements near the periphery of the indicator which are easily accessible for purposes of calibration, thereby avoiding any necessity of closely approaching or inadvertently disturbing inner fragile parts of the indicator assembly.

Another object is to provide an electromagnetic instrument which may be calibrated without subjecting inner parts to inadvertent mishandling and the adjustment being possible without increasing external flux.

To these ends, a feature of the present invention relates to an arrangement of electromagnetic coils, an armature, pole pieces and a field piece, the latter having projections located near the exterior of the indicator and openly accessible for adjustment when calibration is desired.

This and other important features of the invention will now be described in detail in this specification and then pointed out more particularly in the appended claims.

In the drawings:

Fig. 3 is a side view of the gauge shown in Figs. 1 and 2 with a portion of the frame broken away; and Fig. 4 is a perspective view of the gauge with a dial shown in dot-and-dash lines.

Figure 2:
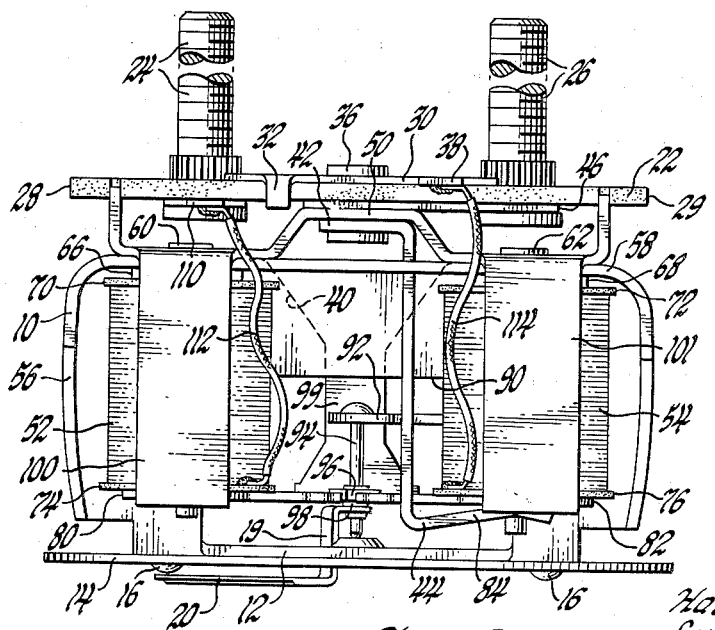
Fig. 2 is a plan view of the gauge shown in Fig. 1.

The gauge disclosed in the drawings is adapted to be mounted on a panel or in casing. It comprises a brass frame 10 having a depending flange 12 to which is attached an aluminum dial 14 by means of fastenings such as rivets 16. The dial is provided with insignia 18 graduated along an arc from an empty to a full position. The dial defines an arcuate opening, not shown in the drawings, to accommodate swinging movement of a horizontal portion 19 of a pointer 20. The indicator is supported by means of a back plate 22 formed of insulating material and through which pass two binding posts 24 and 26. The plate 22 extends at each side as at 28 and 29 to engage a support such as a casing so that the dial 14 and other parts of the indicator are maintained clear of any ground connection. A grounding plate 30 is attaced to the back of the plate 22 by tabs such as the tab 32 (Fig. 2) crimped around the opposed edges of the plate 22. The plate 30 is centrally apertured to be clear of a central rivet 36 and is notched at its sides as at 35 (Fig. 3) to avoid contact with the posts 24 and 26. An upstanding tab 38 is formed integral with the plate 30 for connection in the electrical circuit, such circuit being fully described in the Patent No. 2,883,623 heretofore referred to.

A field plate 40 and one end 42 of a temperature compensator 44 are fixed to the insulator plate 22 by the rivet 36. A conductor plate 46 (Figs. 2 and 3) is interposed between the plate 22 and the central portion 50 of the field plate 40 and is held in place by the rivet 36. Two parallel electromagnetic coils 52 and 54 are supported within the brass frame 10. The sides 56 and 58 of the frame 10 curve upwardly partially to shield the coils. The cores 60 and 62 of the latter are riveted in place and extend through the back walls of the brass frame 10 and the ferrous field plate 40 as well as through two washers 66 and 68 located between the coils and the brass frame. The wiring of the coil 52 is insulated and is separated from the washer 66 by a paper insulator 70. A similar insulator 72 is employed in the form of a washer with relation to the coil 54. The other ends of the coils 52 and 54 bear insulating or paper washers 74 and 76, respectively. The forward ends of the cores 60 and 62 are peened over to retain two angularly shaped magnetic pole pieces 80 and 82, respectively.

Figure 1:
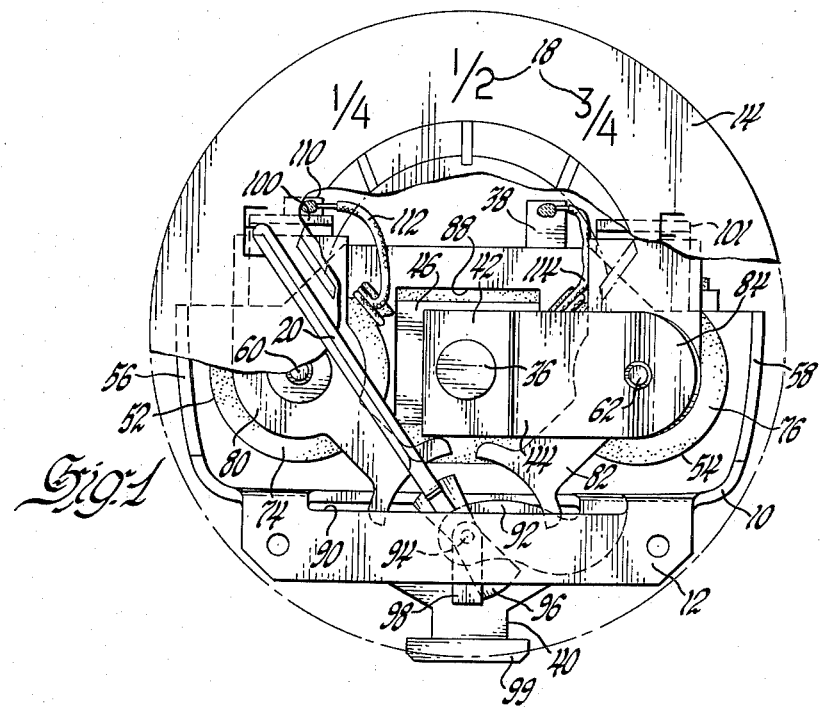
Fig. 1 is a front elevation of a fuel gauge with its dial partially broken away, the gauge embodying features of the present invention.

The temperature compensator 44 is Z-shaped and its forward end 84 is so placed as to receive the end of the core 62. Such a compensator is disclosed in the United States Patent 2,668,944, granted February 9, 1954, and entitled "Temperature Compensator Alloy." The back wall of the brass frame is recessed as at 88 to present clearance around the temperature compensator 44. The bottom of the brass frame bears a rectangular opening 90. A portion of the frame 10 in the form of an arm 92 (Fig. 1) extends from the margin of the opening 90 to serve as a journal for one end of a spindle 94. The spindle is pivotally mounted with respect to and between the arm 92 and the depending flange 12 of the frame.

The spindle 94 carries an armature 96, the pointer 20 and a brass counterweight 98. The latter is so placed on the spindle that with no current passing through the indicator the pointer 20 will be biased toward the empty position.

The field piece 40 is of ferrous material and has three projections 99, 100 and 101 which extend toward the dial 14. The field piece, being of sufficiently ductile material, is such that its projections 99, 100 and 101 may be easily deformed and yet retain their shapes during service. It will be noted that the field piece projection 99 is on the underside of the indicator and terminates adjacent to the underside of the armature 96 whereas the projections 100 and 101 terminate above and adjacent to the upper edges of the pole pieces 80 and 82, respectively.

The cores 60 and 62 are spaced apart around the armature an angular distance of about 90°. The circuitry is as described in the application S.N. 534,076 as heretofore stated, current from a battery being directed to the post 24, through a tab 110 and a connecting line 112 to the coil 52. After passing through the coil 52, the current then divides, part of it going through the coil 54 and to ground by way of line 114 to give the pole pieces 80 and 82 the same polarity. The remainder of the current passes by way of plate 46 and terminal post 26 to a sending instrument such as a float operated rheostat. Fluctuations of the current through the plate 46 will determine the effect of the coils 52 and 54 on the torque exerted in positioning the indicator needle or pointer 20. The lower ends of the pole pieces are arcuately shaped and their edges are coaxial with the spindle 94 and spaced a slight distance from the path of the armature 96. The upper ends of the pole pieces 80 and 82 extend above the coils 52 and 54 and terminate short of the projections 100 and 101. If current is the same through each coil, the pointer will assume a given position. If current is varied through the coil 54, the latter will have more or less effect on the armature 96 which will assume a new position corresponding with the new resultant of the forces developed by the flux of the two coils.

Calibration is conveniently done by bending one or more of the projections 99, 100 and 101 toward or away from the assembly thereby changing the air gaps between the pole pieces 80 and 82 and the projections 100 and 101 are at the top and/or between the armature 96 and the projection 99 at the bottom. One, two or all three of the air gaps may be easily changed to effect the desired calibration. This ease results from the open accessibility of the three projections.

In electromagnetic indicators as heretofore produced, calibration has been brought about by reducing the influence of a coil on an armature by increasing the space between a projection on a field and the armature. This increases the reluctance of that path but also increases the flux in all other paths in space which link the coil. This increase in external flux has caused difficulties for when such an increase obtains, a temperature gauge may be influenced by an adjacent ammeter and a gasoline gauge may work perfectly until placed in an instrument panel assembly. With the present invention these difficulties are avoided for the herein described invention provides an arrangement such that when calibration is being effected and the reluctances increased, there is no increase in the external flux.

We claim:

1. An instrument including a nonmagnetic frame, a dial on said frame, means pivoted on said frame for rotation about an axis and including a flat armature of magnetic material and a pointer in registry with said dial, two parallel and magnetic cores arcuately spaced about said axis and each having one end fixed to said frame, an electromagnetic coil on each of said cores, a flat magnetic pole piece fixed to the other end of each of said cores and cooperating with said armature in defining an air gap, a magnetic field piece fixed to said frame and in contact with said one end of each of said cores, three projections on said field piece being adjustably positioned, one of said projections forming an air gap with said armature, and each of the other projections extending along one of said coils and terminating close to the corresponding pole piece to form another air gap.

2. An instrument including a pointer, a nonmagnetic frame, two electromagnetic coils having magnetic cores fixed to said frame and arcuately spaced about an axis parallel with said cores, an elongated flat magnetic armature, a shaft pivoted on said frame to rotate on said axis and supporting said pointer and armature for unitary rotation, two flat magnetic pole pieces, each of the latter being fixed on one end of one of said cores and forming an air gap with said armature, a magnetic field piece fixed to the other end of each of said cores and having three projections, one of said projections extending along and beneath said shaft and terminating close to said armature to define an air gap, and each of the other two projections extending above and along one of said coils to terminate close to the pole piece of the corresponding core to define another air gap.

3. An instrument including a nonmagnetic frame supporting a dial, a shaft pivoted on said frame, a pointer registering with said dial and carried by said shaft, a magnetic armature fixed to said shaft to rotate therewith, two electromagnetic coils having magnetic cores fixed to said frame and being arcuately spaced about said shaft, two magnetic pole pieces, each of the latter being fixed to one end of a core and defining an air gap with said armature, a magnetic field piece fixed to the other ends of said cores and having integral projections, one of said projections terminating close to said armature cooperatively to define an air gap, one other of said projections extending along one of said coils and terminating close to the corresponding pole piece to define another air gap, and the arrangement being such that calibration without increasing the external flux may be undertaken by adjustment of said projections.

References Cited in the file of this patent
UNITED STATES PATENTS

| | | |
|---|---|---|
| 1,753,402 | Cheney | Apr. 8, 1930 |
| 2,040,060 | Middleton | May 5, 1936 |
| 2,507,801 | Middleton | May 16, 1950 |
| 2,626,297 | Leippe | Jan. 20, 1953 |
| 2,851,663 | Kelly | Sept. 9, 1958 |